Jan. 22, 1952  A. E. RUDAHL  2,583,279
PERCOLATOR COFFEE MAKER
Filed Feb. 24, 1950
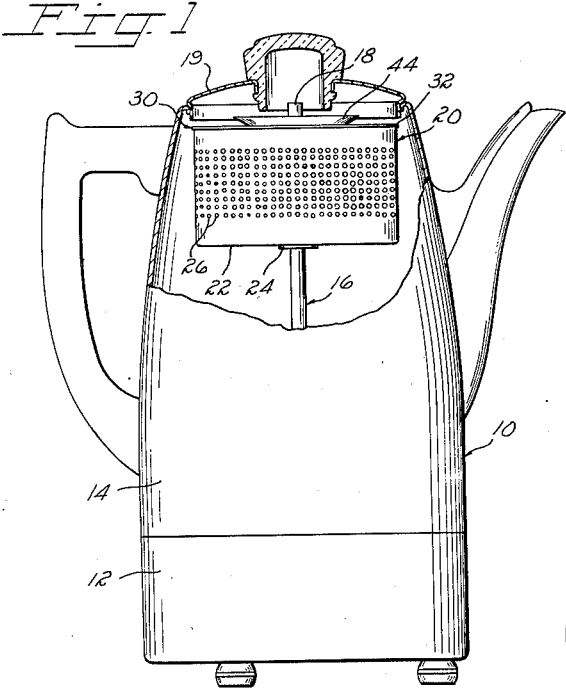
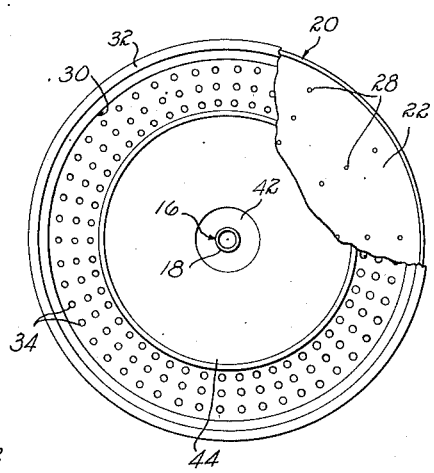
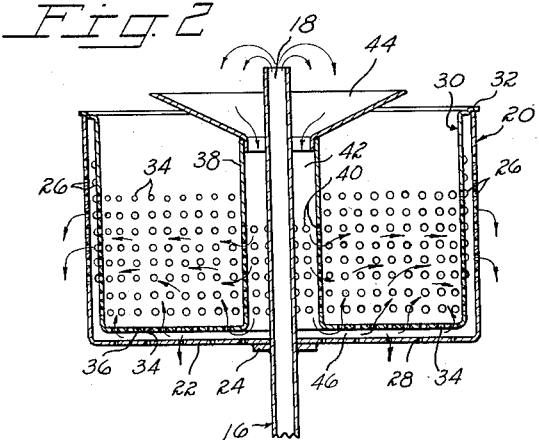
Inventor
ARNOLD E. RUDAHL
By
Lindsey, Prutzman & Just
Attorneys Patented Jan. 22, 1952

2,583,279

UNITED STATES PATENT OFFICE 2,583,279

PERCOLATOR COFFEE MAKER

Arnold E. Rudahl, Middlefield, Conn., assignor to Landers, Frary & Clark, New Britain, Conn., a corporation of Connecticut Application February 24, 1950, Serial No. 145,981

4 Claims. (Cl. 99—311)

This invention relates to improvements in coffee makers of the percolator type and more particularly to the basket thereof and means for circulating fluid therethrough.

Conventional coffee makers of the percolator type usually include a fountain tube which is supported from the bottom of the coffee maker and a basket which is supported adjacent the upper end of the fountain tube, the basket having an opening in its bottom through which the tube extends. A pump means is provided adjacent the bottom of the fountain tube for purposes of causing fluid to rise within said tube and be discharged from the upper end thereof into the basket, the fluid contacting the top portion of the supply of ground coffee contained within the basket. The fluid filters downward through the ground coffee to form a brew which is discharged through perforations in the bottom and sides of the basket. The fluid gradually becomes a brew of coffee which is re-circulated through the fountain tube and ground coffee within the basket until the brew attains the desired concentration and flavor.

When fluid is discharged from the upper end of the fountain tube into the basket, the fluid engages the supply of ground coffee within the basket from the top and filters downward through the coffee as aforesaid. This results in a distinct tendency to pack the ground coffee within the basket so as to retard filtering and thereby decrease the rate at which coffee is brewed. Compacting the ground coffee in this manner also prevents or retards the ready intermingling of the fluid with all particles of the ground coffee as the fluid filters downward into the coffee. Thus, it has not been possible to brew coffee at a relatively rapid rate when using conventional percolator structures, nor has the most efficient use of all particles of the ground coffee been possible.

It is an object of the present invention to provide a simple and inexpensive percolator structure capable of easily being separated and cleansed and operable to maintain ground coffee within the basket of the percolator in at least a partial state of flotation while the fluid is in contact with the ground coffee for purposes of making a brew therefrom.

Another object of the invention is to provide a percolator structure by which the rate at which fluid filters through the ground coffee within the percolator basket is much more rapid than in conventional percolators and the contact of the fluid with all particles of the ground coffee is readily effected for purposes of more efficiently using the ground coffee to form a brew therefrom.

Details of the foregoing objects and of the invention, as well as other objects thereof, are set forth in the specification and illustrated in the accompanying drawing forming a part thereof.

In the drawing:

Fig. 1 is a side elevation of an exemplary coffee maker of the percolator type, part of the coffee maker being broken away and otherwise shown in section to illustrate details of certain components of the invention.

Fig. 2 is a vertical sectional elevation of the upper portion of the percolator construction illustrated in Fig. 1.

Fig. 3 is a top plan view of Fig. 2, part of the structure shown in Fig. 3 being broken away to illustrate further details of the components illustrated therein.

Referring to the drawing in which like numerals are used to indicate like parts, the percolator coffee maker 10 may be of any suitable type such as that having a self-contained electric heating unit in the base 12 thereof or the percolator may be of the type which is placed upon a heating unit of a stove for purposes of heating the fluid within the coffee maker. The brew or fluid receptacle 14 is positioned above the base 12 and the bottom of the receptacle 14 supports the lower end of a fountain tube 16. The lower portion of the fountain tube is connected to a suitable pump, not shown, of any desirable type such as presently used in many types of percolator type coffee makers, and by which water or brew within the receptacle 14 is circulated upward through the fountain tube 16 and discharged from the upper end 18 thereof. The top of the receptacle 14 has an opening which is normally closed by a conventional cover 19.

In accordance with the present invention, ground coffee is supported within container and brewing means surrounding the upper portion of fountain tube 16 as follows. A cup-like member 20 is preferably apertured centrally of its bottom 22 to receive the fountain tube 16, as clearly shown in Fig. 2. Fixed to the tube 16 is a washer 24 which engages the bottom 22 of member 20 for purposes of supporting said member relative to tube 16. The member 20 is provided in its sides with a plurality of perforations 26 of a size and spacing suitable to permit relatively rapid discharge of fluid therethrough, in a manner to be described. The lowermost apertures 26 in the sides of the member 20 are spaced above the bottom 22 thereof at an appreciable distance, as shown in Fig. 2, also for purposes to be described. The bottom 22 of the member 20 is also provided with a limited number of perforations 28, materially fewer in number and substantially smaller in size than the perforations 26. The function of said perforations will also be hereinafter described.

A cup-shaped basket 30 having a smaller diameter and also of less height than member 20 is nested within member 20, as illustrated in Fig. 2, the sides and bottom of the basket 30 being spaced from the sides and bottom of member 20. Integral with the upper edge of the basket 30 is a laterally extending annular flange 32 having a suitable shoulder, as illustrated in Fig. 2, engaging the rim of the member 20 for purposes of positioning and supporting basket 30 relative to member 20. The sides and bottom of the basket 30 are provided with a plurality of perforations 34, the size and spacing of said perforations preferably being similar to perforations 26 in the sides of member 20.

The bottom 36 of basket 30 is centrally apertured and a sleeve 38 extends upward from the perimeter of said aperture, as clearly shown in Fig. 2. At least the lower portion of sleeve 38 is also provided with a plurality of perforations 40 and said sleeve has a diameter materially greater than that of the fountain tube 16, with which it is concentric, to provide an annular space 42 between said sleeve and fountain tube. A funnel member 44, supported by the upper end of sleeve 38, extends upward and outward therefrom, as shown in Fig. 2. The upper end 18 of fountain tube 16 also preferably extends somewhat above the end of sleeve 38.

In operation, assuming that a new brew of coffee is to be made, water is placed within the receptacle 14 and a supply of ground coffee is in the basket 30. Heating of the water is commenced and some of the water is forced by the pump at the lower end of fountain tube 16 upward through said fountain tube and is discharged from the upper end 18 thereof into the funnel 44, as indicated by some of the arrows in Fig. 2. The water is directed by the funnel 44 into the sleeve 38 through which it travels downward and some passes into the space 46 between the bottoms of the member 20 and the basket 30. Some of the water will also pass laterally from sleeve 38, through the perforations 40 therein, into the interior of the basket 30 which contains the ground coffee. The portion of the water which enters the space 46 will also flow upward through perforations 34 therein into the interior of basket 30.

Such lateral and upward flow of water through perforations 40 in sleeve 38 and perforations 34 in the bottom 36 of basket will quickly saturate the ground coffee particles and also effect at least a partial flotation of said particles within the basket 30. Thus, the contact of the water with the coffee particles in this manner will prevent any noticeable compacting of the coffee particles within the basket, in marked contrast to the compacting of the particles by conventional percolators wherein water is discharged into the top of the backet and directly against the top of the supply of ground coffee within the basket. The limited number of very small or fine perforations 28 in the bottom 22 of member 20 will permit some of the water to exit therethrough but the smaller number and size of said perforations, as compared to the number and size of the perforations in the bottom of basket 30, will cause most of the water to pass into the interior of the basket 30 through the aforementioned perforations 40 in sleeve 38 and perforations 34 in the bottom of the basket 30, as described above.

As the water engages the ground coffee within the basket as aforesaid, a brew will be formed. Some of the resulting brew will begin to discharge through the perforations 34 in the sides of the basket 30. Some of said brew will also be discharged through the perforations 34 in the bottom of the basket as well as those in the sides thereof and the discharged brew, when accumulated within the member 20 in sufficient amount to rise to the level of the lower-most perforations 26 in member 20, will begin to discharge through said perforations 26 into the brew receptacle 14 of the coffee maker. Such brew will be re-circulated through fountain tube 16 and continuously be re-cycled through the ground coffee within the basket 30 in the manner described above. The provision of said limited number of fine perforations 28 in the bottom of member 20 ensures complete drainage of all brew from the basket 30 and member 20 such as, for example, after flow through the fountain tube 16 ceases when heating of the brew is stopped near the completion of a brewing operation.

The aforementioned flotation of the ground coffee within the basket 30 while water or brew is passing therethrough will not only provide ready and relatively rapid passage or filtering of the water or brew through the ground coffee so as to increase the speed of brewing operations but such flotation will also ensure that all or substantially all of the particles of ground coffee will be engaged by the water or brew during the brewing operations, thus producing a much more rapid and efficient brewing than is possible with conventional percolators. The ground coffee particles will also be rendered somewhat turbulent within the basket during brewing operations, but the perforated basket 30 and member 20 cooperate to provide a double filtering or straining function and thereby will ensure against very much, if any, of the coffee particles being discharged into the brew contained in the receptacle 14.

The components of the percolator structure comprising the present invention are not only simple and easily manufactured but they are also capable of being simply and quickly separated to effect removal of the used coffee particles from the basket and also permit thorough cleansing of the basket 30 and member 20, as well as the fountain tube 16 and the other components of the entire percolator which require cleansing after a brewing operation.

While the invention has been illustrated and described in its preferred embodiment and has included certain details, it should be understood that the invention is not to be limited to the precise details herein illustrated and described since the same may be carried out in other ways, falling within the scope of the invention as claimed.

I claim as my invention:
1. In a coffee maker of the percolator type having a fountain tube rising from the bottom thereof, the combination therewith of a cup-shaped member surrounding the upper portion of said fountain tube, and a cup-shaped basket nested within said member and spaced therefrom at its bottom and sides, the bottom and sides of said basket and the sides of said mem- ber being perforated, said basket further having a perforated sleeve extending upward from the bottom thereof in spaced surrounding relation to said fountain tube and being open at its ends, and means for deflecting fluid raised by the fountain tube into said sleeve exterior of the tube.

2. In a coffee maker of the percolator type having a fountain tube supported from the bottom thereof, the combination therewith of a cut-shaped member surrounding and supported at its bottom by the upper portion of said fountain tube, the sides of said member being perforated in an area spaced above the bottom and the bottom having a relatively fewer perforations of smaller size than in said sides, a cup-shaped basket nested within said member and spaced therefrom at its bottom and sides, the bottom and sides of said basket being perforated, and a perforated sleeve extending upward from the bottom of said basket and being open at its ends, said sleeve surrounding said fountain tube and being spaced therefrom.

3. In a coffee maker of the percolator type having a fountain tube supported from the bottom thereof, the combination therewith of a cup-shaped member surrounding and supported at its bottom by the upper portion of said fountain tube, a cup-shaped basket nested within said member and spaced therefrom at its bottom and sides, the bottom and sides of said basket and the sides of said member being perforated, a perforated sleeve extending upward from an aperture in the bottom of said basket and being open at its ends, said sleeve surrounding said fountain tube and being spaced therefrom, and a funnel extending upward and outward from the upper end of said sleeve.

4. In a coffee maker of the percolator type having a fountain tube supported from the bottom thereof, the combination therewith of a cup-shaped member surrounding and supported at its bottom by the upper portion of said fountain tube, a cup-shaped basket of smaller diameter and less height than said member and having a flange projecting laterally from the upper edge thereof, said flange engaging the upper edge of said member to support said basket in nested relation within said member and spaced therefrom at its bottom and sides, the bottom and sides of said basket and the sides of said member being perforated, and a perforated sleeve extending upward from an aperture in the bottom of said basket and being open at its ends, said sleeve surrounding said fountain tube and being spaced therefrom.

ARNOLD E. RUDAHL.

REFERENCES CITED

The following references are of record in the file of this patent:

UNITED STATES PATENTS

| Number | Name | Date |
| --- | --- | --- |
| 201,139 | Weller | Mar. 12, 1878 |
| 628,705 | Goldsmith | July 11, 1899 |
| 745,883 | Montgomery | Dec. 1, 1903 |
| 1,943,386 | Johnson | Jan. 16, 1934 |